United States Patent [19]

Kimura

[11] Patent Number: 4,583,135

[45] Date of Patent: Apr. 15, 1986

[54] TRACKING DEVICE USING MULTIPLE PIEZOELECTRIC ELEMENTS FOR TRACK CENTERING

[75] Inventor: Kenji Kimura, Tokyo, Japan

[73] Assignee: Olympus Optical Co., Ltd., Tokyo, Japan

[21] Appl. No.: 461,162

[22] Filed: Jan. 26, 1983

[30] Foreign Application Priority Data

Feb. 4, 1982 [JP] Japan .................................. 57-16644

[51] Int. Cl.[4] ........................ G11B 21/10; G11B 21/02

[52] U.S. Cl. ...................................... 360/77; 360/109; 310/328

[58] Field of Search ................. 360/77, 107, 109, 104, 360/DIG. 1, 75; 369/43–46, 144; 310/328, 311, 317, 330–332

[56] References Cited

U.S. PATENT DOCUMENTS

| | | | |
|---|---|---|---|
| 3,526,726 | 9/1970 | Corbett et al. | 360/109 |
| 3,808,488 | 4/1974 | Massa | 310/328 |
| 4,188,645 | 2/1980 | Ragle et al. | 360/109 |
| 4,233,637 | 11/1980 | Kubota | 360/109 |
| 4,302,830 | 11/1981 | Hamaoka et al. | 369/44 |
| 4,342,935 | 8/1982 | Kallmeyer et al. | 369/45 |
| 4,411,128 | 4/1984 | Ohba et al. | 360/75 |

FOREIGN PATENT DOCUMENTS

| | | | |
|---|---|---|---|
| 0153448 | 1/1982 | German Democratic Rep. | 360/109 |
| 52-49012 | 4/1977 | Japan | 360/77 |
| 56-119973 | 9/1981 | Japan | 360/77 |

OTHER PUBLICATIONS

IBM TDB vol. 15, No. 10, "Closed-Loop Head Positioning Apparatus" Grant et al., Mar. 1973, pp. 3183–3184.

*Primary Examiner*—Donald McElheny, Jr.
*Assistant Examiner*—Steven R. Garland
*Attorney, Agent, or Firm*—Frishauf, Holtz, Goodman & Woodward

[57] ABSTRACT

A tracking device comprises a frame having a pair of opposed legs, a magnetic head disposed midway between the pair legs and a pair of piezoelectric members sandwiching the magnetic head and clamped together with the head between the two legs of the frame. Opposite polarity voltages are applied to the piezoelectric members according to tracking information. The applied voltages cause expansion and contraction of the piezoelectric members to effect tracking control of the head.

14 Claims, 5 Drawing Figures

14
23a
22
23b
B
A
20
21a
G
21b
24
FROM OP AMP 55
25

TRACKING DEVICE USING MULTIPLE PIEZOELECTRIC ELEMENTS FOR TRACK CENTERING

BACKGROUND OF THE INVENTION

This invention relates to a tracking device for a helical scanning VTR in which recording tracks are formed at an angle to the longitudinal direction of a magnetic tape or a magnetic recording and reproducing system in which concentric or spiral recording tracks are formed on a magnetic disc and, more particularly, to a tracking device for displacing a magnetic head in the direction of the track width according to tracking information.

In the usual tracking device of this type, a magnetic head is mounted on the tip of a bimorph element (which is comprised of a piezoelectric element), and the center position of the magnetic head gap is held coincident with the center position of the track at all times by applying a predetermined voltage to the bimorph element according to tracking information.

In this tracking device, however, the mechanical strength of the bimorph element itself is comparatively low. Therefore, the magnetic head is liable to be greatly deviated from its regular position by an external force such as a force produced when the tip of the magnetic head is brought into contact with the recording surface of a magnetic tape or a magnetic disc. In such a case, it is necessary for restoring the magnetic head to the optimum operating position to apply a considerably large correcting voltage to the bimorph element. This means that the dynamic range of an amplifier for supplying the correcting voltage must be considerably increased, which is disadvantageous from the standpoint of cost. The deviation mentioned above also gives an off-set to a tracking servo system. In order to absorb this off-set, it is necessary to extremely increase the servo gain of the tracking servo system. To do so, there are problems in view of ensuring the stability of the servo system. The bimorph element is formed by cementing together two thin ceramics, or it comprises a piezoelectric element and a non-piezoelectric film such as a metal film or a polymer film cemented to the non-piezoelectric element. In order to cause a great displacement of the magnetic head, therefore, the bimorph element must have a considerable length. To increase the length of the bimorph element, the length of the ceramics must also be increased. For this reason, the ceramics must also be quite thick in order to ensure its mechanical strength. In this case, a considerably high drive voltage must be applied to the bimorph element in order to obtain sufficient operation.

Because of the relationship of the thickness, length, drive voltage and deformation of the bimorph element as mentioned above, it is difficult to design a bimorph element which is well-suited for tracking.

SUMMARY OF THE INVENTION

An object of the invention is to provide a tracking device, which permits stable tracking without being influenced by the external force produced when the magnetic head is brought into contact with the recording surface.

According to the invention, there is provided a tracking device, which controls the tracking of the magnetic head by making use of a thickness extensional mode of piezoelectric elements.

According to the invention, there is also provided a tracking device, with which high mechanical strength of the element for driving the magnetic head can be ensured without the need for increasing the length of the element and which can also be readily assembled and adjusted.

According to the invention, there is further provided a tracking device, in which the magnetic head is sandwiched between first and second piezoelectric members, and opposite polarity voltages are applied to the first and second piezoelectric members according to tracking information so that the magnetic head is moved according to the deformation of the first and second piezoelectric members.

DETAILED DESCRIPTION OF THE PREFERRED EMBODIMENT

Figure 1:
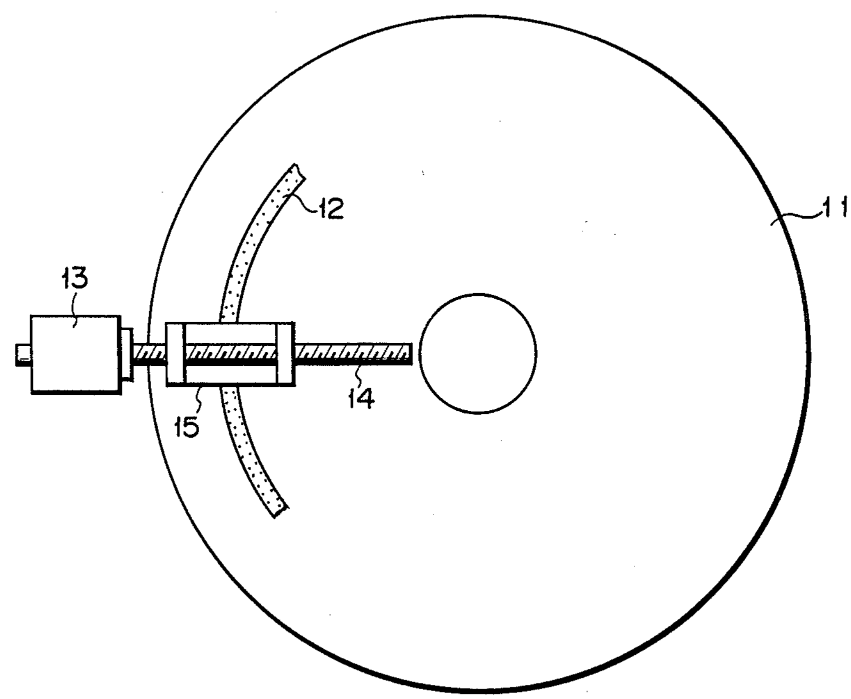
FIG. 1 is a plan view showing a disc apparatus using an embodiment of the tracking device according to the invention.

Referring now to FIG. 1, there is shown a rotary magnetic disc 11 having recording tracks as typically shown by 12. A step motor 13 for moving a magnetic head has its shaft integrally coupled to a lead screw 14. A head actuator or a head holder 15 is screwed on the lead screw 14. The lead screw 14 and head holder 15 are coupled to each other with a ball bearing thread structure where balls are interposed between the screw 14 and holder 15, and the head holder 15 is moved in the radial direction of the disc 11 as the lead screw 14 is rotated by the step motor 13.

Figure 2:
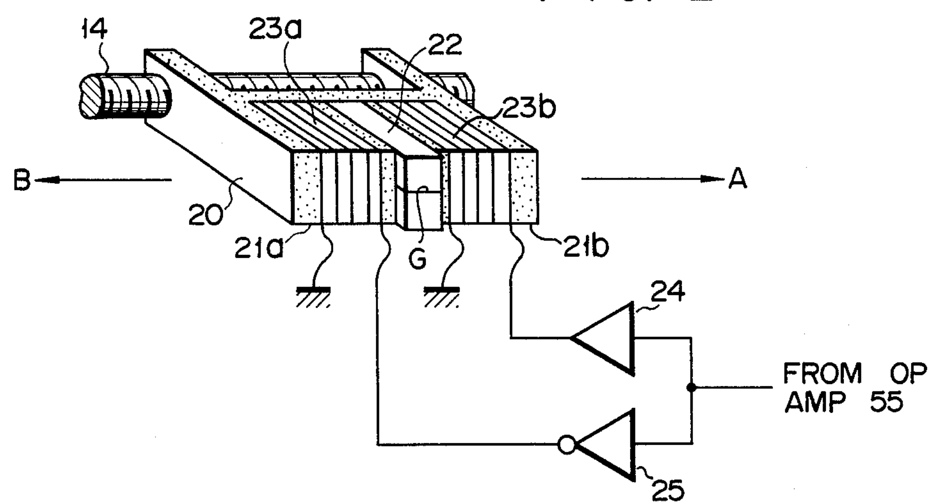
FIG. 2 is a perspective view showing the tracking device of FIG. 1.

FIG. 2 is a perspective view showing a specific construction of the head holder 15 shown in FIG. 1. As is shown, the head holder 15 includes an H-shaped frame 20 having a sufficient mechanical strength. A magnetic head 22 having a gap G is mounted, in a state sandwiched between first and second piezoelectric members 23*a* and 23*b* formed of a plurality of superposed piezoelectric elements e.g. ceramics (barium titanate) or Rochelle salt, between opposed legs 21*a* and 21*b* of the frame 20. A positive voltage and a negative voltage provided from voltage amplifiers 24 and 25 are applied as control voltages to the first and second piezoelectric members 23*a* and 23*b*. The one ends of the the first and second piezoelectric members 23*a* and 23*b* are bonded by means of adhesive to the respective legs 21*a* and 21*b*. The other ends of first and second piezoelectric members 23*a* and 23*b* are also bonded by means of adhesive to the opposite sides of the magnetic head 22.

Figure 3:
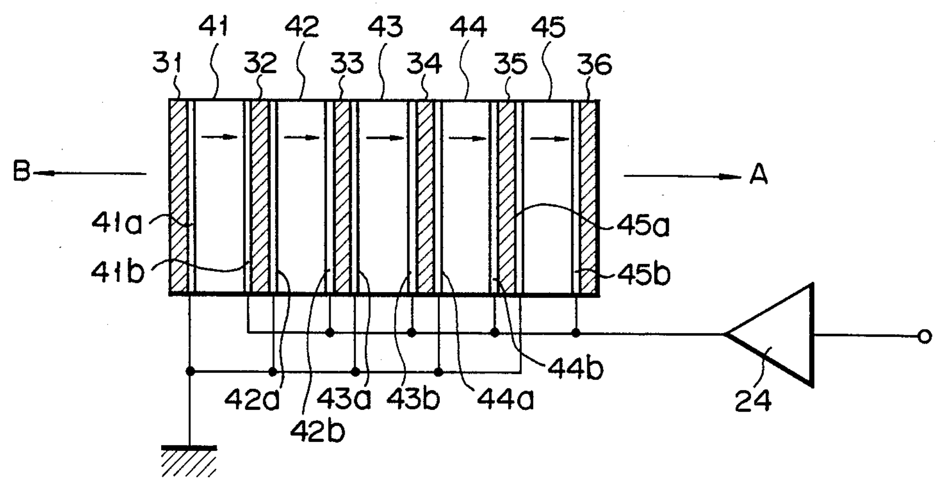
FIG. 3 is a circuit diagram showing an equivalent circuit of the tracking device of FIG. 2.

FIG. 3 is a view showing the detailed construction of the first and second piezoelectric members 23*a* and 23*b*. In FIG. 3, only the first piezoelectric member 23*a* is shown. The member 23*a* is formed of insulators 31 to 36 and piezoelectric elements 41 to 45 which are alternately superposed. Electrode layers 41*a* and 41*b* to 45*a* and 45*b* are provided on the opposite sides of the respective piezoelectric elements 41 and 45. The electrode layers 41*a* to 45*a* on the left side of piezoelectric elements 41 to 45 in the Figure are grounded, while the electrode layers 41*b* to 45*b* on the right side of the piezoelectric members are connected to the output terminal of the voltage amplifier 24 noted above. In accordance with tracking information, a control voltage is produced from the voltage amplifier 24, and is applied to the piezoelectric elements 41 to 45 in parallel. If the control voltage is a positive voltage, a biasing force in the direction of arrow A in FIG. 3 is produced. If the control voltage is a negative voltage, a biasing force in the direction of arrow B is produced. The biasing force noted above is applied to the head 22 in the same direction as the first and second piezoelectric members 23*a* and 23*b*. More particularly, when the piezoelectric elements of the piezoelectric member 23*a* are expanded in the direction of its thickness, as shown in FIG. 2, according to the applied voltage, the voltage applied from the inverted voltage amplifier 25 to the other piezoelectric member 23*b* tends to contract the member 23*b*. The simultaneous expansion of the piezoelectric elements of the member 23*a* and contraction of the piezoelectric elements of the number 23*a* have an effect of displacing the magnetic head 23 in the direction of arrow A.

Figure 4:
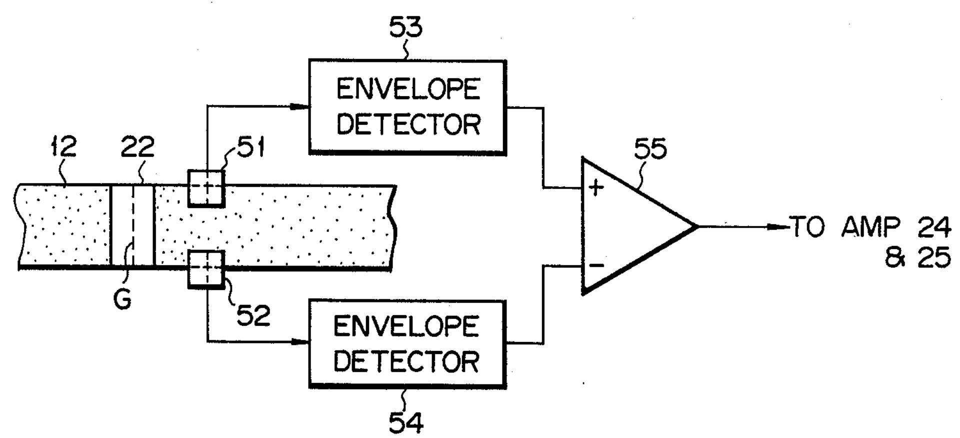
FIG. 4 is a circuit diagram showing a tracking detecting section for detecting tracking information.

FIG. 4 shows a tracking information detector. A pair of reproducing heads 51 and 52 are provided for detecting tracking information. These heads 51 and 52 are positioned such that their respective gap centers coincide with the opposite edges of the relevant track 12 when the magnetic head 22 is in the optimum tracking state. They can be moved in unison with the magnetic head 22 in the direction of the track width. The outputs of the tracking information detection heads 51 and 52 are enveloped by respective enveloping circuits (envelope detectors) 53 and 54, and the outputs thereof are fed to a differential amplifier 55. The output of the differential amplifier 55 is supplied as tracking information to the voltage amplifier 24.

With the tracking device of the above construction, when a tracking error of the head 22 occurs, a difference is produced between the outputs of the tracking information detection heads 51 and 52. As a result, a positive or negative output is produced at tracking information from the differential amplifier 55 according to the difference. The tracking information is amplified by the voltage amplifier 24 and also by the inverted voltage amplifier 25. The opposite phase voltages which are produced from the respective amplifiers 24 and 25 are applied as control voltages to the superposed piezoelectric elements of the members 23*a* and 23*b*. The piezoelectric members 23*a* and 23*b* thus exert driving forces to the head 22 in the direction of arrow A or B in FIG. 2, whereby the tracking control of the head 22 is performed such that its center position is brought back into register with the center position of the track 12. Since the head 22 is sandwiched between the opposite side piezoelectric members 23*a* and 23*b*, which are in turn firmly clamped between the opposed legs 21*a* and 21*b* of the frame 20, it will not be greatly deviated even if an external force is exerted to it. Thus, unlike the prior art, there is not need of particularly increasing the dynamic range of the amplifier 24 for applying large voltages to the piezoelectric members 23*a* and 23*b* for the correction of the deviation. Further, there is no need of ensuring a servo system gain for absorbing an off-set, so that the stability of the servo system can be obtained. Further, since the head 22 is uniformly urged at its opposite sides by the pair of piezoelectric members 23*a* and 23*b* between the parallel legs 21*a* and 12*b* of the head 22, as shown in FIG. 2, the vertical and parallel status of the head 22 can be readily obtained without provision of any particular adjusting means.

Figure 5:
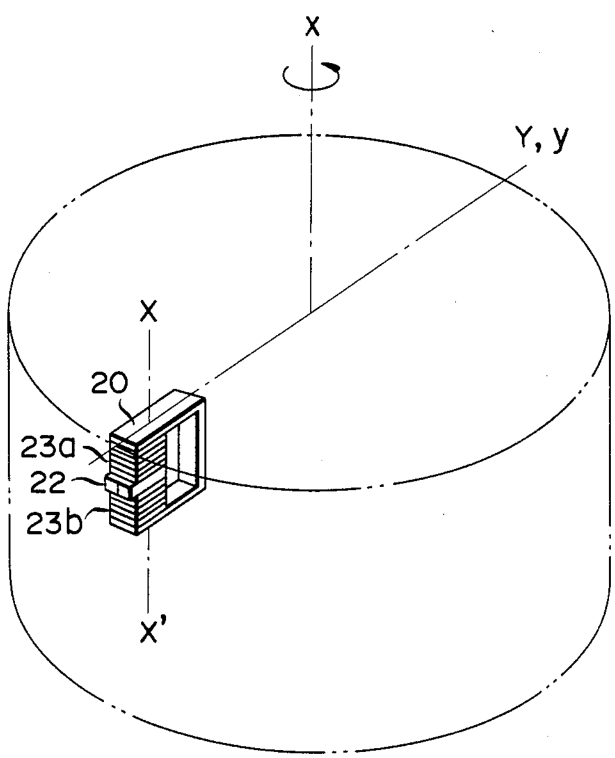
FIG. 5 is a perspective view showing a tracking device using a helical scan system.

Further, when applying the invention to a helical scan type VTR, the head holder as shown in FIG. 5 may be mounted on a rotary cylinder, on which a magnetic tape is wound. In this case, the lead screw 14 is unnecessary, and it is only necessary to mount the frame 20 such that its axis X—X′ is parallel with the axis of rotation of the rotary cylinder.

Further, while the above embodiment has used the superposed piezoelectric elements as the piezoelectric members to sandwich the head 22 therebetween, it is also possible to use a single piezoelectric element depending upon the size of the head 22.

As has been described in the foregoing, according to the invention, the magnetic head is firmly sandwiched between the opposite side piezoelectric members which are in turn firmly clamped between parallel and opposite legs of a frame having high mechanical strength. Thus, it is possible to provide a tracking device with which the magnetic head can be stably head and which is not adversely affected irrespective of any external force applied to it so that stable tracking control can be obtained.

Further, with the tracking device according to the invention the head actuator can be reduced in size and be made more rigid compared to the prior art head actuator using a bimorph element. Further, the head actuator of the tracking device according to the invention can be used not only as a magnetic head actuator for a video tape recorder or a magnetic disc recorder but also as a tracking actuator for an optical head of an optical disc recorder or as a focusing actuator. The invention is particularly suitable for a head actuator of a small-size portable magnetic recorder.

What is claimed is:

1. A tracking device comprising:

a substantially rigid frame having a pair of opposed substantially rigid legs and having a predetermined high mechanical strength;

a head member disposed between said opposed legs of said frame and adapted to be held against a track of a recording medium, said head member having at least two sides;

a first piezoelectric member secured between one of said opposed legs of said frame and one side of said head member;

a second piezoelectric member secured between the other of said opposed legs of said frame and the other side of said head member;

said first and second piezoelectric members each including a plurality of superposed piezoelectric elements;

electrodes formed on the opposite sides of each of said piezoelectric elements;

insulators interposed between adjacent ones of said piezoelectric elements; and means for applying drive voltages to said electrodes of said first and second piezoelectric members according to tracking information to cause selective expansion and contraction (or vice versa) of said first and said second piezoelectric members so as to cause a displacement of said head member relative to said frame, said predetermined mechanical strength of said frame being sufficiently high that there is substantially no deformation of said frame or said legs due to said expansion and contraction of said piezoelectric members.

2. The tracking device according to claim 1, wherein said head member is a magnetic head.

3. The tracking device according to claim 1, wherein said means for applying drive voltages includes a pair of tracking information detection head members having outputs and disposed at positions corresponding to the opposite edges of the track, difference detecting means for detecting the difference between the outputs of said tracking information detection head members and for producing a difference output, and means for taking out the difference output of said difference detecting means as opposite polarity drive voltages and for applying said drive voltages to said respective first and second piezoelectric members.

4. The tracking device according to claim 3, wherein said difference detecting means includes respective envelope detector means coupled to the outputs of said tracking information detection head members, and means for comparing the output signals from said respective envelope detector means to produce said difference output.

5. The tracking device according to claim 1, wherein said recording medium is a magnetic disc, and which further comprises means for moving said head member in unison with said first and second piezoelectric members and said frame in radial directions of said magnetic disc.

6. The tracking device according to claim 1, wherein said recording medium is a magnetic tape used with a helical scan type video tape recorder having a rotary cylinder, and comprising means for mounting said frame relative to said rotary cylinder such that said frame supporting said head member together with said first and second piezoelectric members is disposed parallel to the axis of rotation of said rotary cylinder of said video tape recorder.

7. The tracking device according to claim 1, wherein said head member is disposed substantially midway between said opposed legs.

8. A tracking device comprising:

a substantially rigid H-shaped frame including two substantially parallel members opposed to each other and a connecting member disposed between said parallel members so as to connect said parallel members, each of said members being substantially rigid and having a predetermined mechanical strength;

a head member disposed between said parallel members of said frame and adapted to be held against a track of a recording medium, said head member having at least two sides;

a first piezoelectric member secured between one of said parallel members of said frame and one side of said head member;

a second piezoelectric member secured between the other of said parallel members of said frame and the other side of said head member;

said first and second piezoelectric members each including a plurality of superposed piezoelectric elements;

electrodes formed on the opposite sides of each of said piezoelectric elements;

insulators interposed between adjacent ones of said piezoelectric elements; and means for applying drive voltages to said electrodes of said first and second piezoelectric members according to tracking information to cause selective expansion and contraction (or vice versa) of said first and said second piezoelectric members so as to cause a displacement of said head member relative to said parallel members, said predetermined mechanical strength of said frame members being sufficiently high that there is substantially no deformation of said frame members due to said expansion and contraction of said piezoelectric members.

9. The tracking device of claim 8, wherein said head member is disposed substantially midway between said parallel frame members.

10. The tracking device according to claim 8, wherein said head member is a magnetic head.

11. The tracking device according to claim 8, wherein said means for applying drive voltages includes a pair of tracking information detection head members having outputs and disposed at positions corresponding to the opposite edges of the track, difference detecting means for detecting the difference between the outputs of said tracking information detection head members and for producing a difference output, and means for taking out the difference output of said difference detecting means as opposite polarity drive voltages and for applying said drive voltages to said respective first and second piezoelectric members.

12. The tracking device according to claim 11, wherein said difference detecting means includes respective envelope detector means coupled to the outputs of said tracking information detection head members, and means for comparing output signals from said respective envelope detector means to produce said difference output.

13. The tracking device according to claim 8, wherein said recording medium is a magnetic disc, and which futher comprises means for moving said head member in unison with said first and second piezoelectric members and said frame in radial directions of said magnetic disc.

14. The tracking device according to claim 8, wherein said recording medium is a magnetic tape used with a helical scan type video tape recorder having a rotary cylinder, and comprising means for mounting said frame relative to said rotary cylinder such that said frame supporting said head member together with said first and second piezoelectric members is disposed parallel to the axis of rotation of said rotary cylinder of said video tape recorder.

* * * * *